United States Patent [19]
Crouch et al.

[11] Patent Number: 6,082,679
[45] Date of Patent: Jul. 4, 2000

[54] ACTIVE SYSTEM FOR EARLY DESTRUCTION OF TRAILING VORTICES

[75] Inventors: Jeffrey D. Crouch, Issaquah; Philippe R. Spalart, Redmond, both of Wash.

[73] Assignee: The Boeing Company, Seattle, Wash.

[21] Appl. No.: 08/964,941

[22] Filed: Nov. 5, 1997

Related U.S. Application Data

[60] Provisional application No. 60/050,807, Jun. 26, 1997.
[51] Int. Cl.$^7$ .............................. B64C 23/06; B64C 9/00; B64C 13/16
[52] U.S. Cl. .......................... 244/199; 244/201; 244/203
[58] Field of Search .................................... 244/130, 199, 244/204, 201, 203

[56] References Cited

U.S. PATENT DOCUMENTS

| | | |
|---|---|---|
| 2,125,738 | 8/1938 | Rose . |
| 3,411,738 | 11/1968 | Sargent . |
| 3,596,854 | 8/1971 | Haney, Jr. . |
| 3,692,259 | 9/1972 | Yuan . |
| 3,712,564 | 1/1973 | Rethorst . |
| 3,904,151 | 9/1975 | Rethorst . |
| 3,997,132 | 12/1976 | Erwin . |
| 4,108,403 | 8/1978 | Finch . |
| 4,477,042 | 10/1984 | Griswold . |
| 4,813,631 | 3/1989 | Gratzer . |
| 4,917,332 | 4/1990 | Patterson . |
| 5,150,859 | 9/1992 | Ransick . |
| 5,158,251 | 10/1992 | Taylor . |
| 5,209,438 | 5/1993 | Wygnanski .............................. 244/203 |
| 5,297,764 | 3/1994 | Haney . |
| 5,492,289 | 2/1996 | Nosenchuck et al. . |

FOREIGN PATENT DOCUMENTS

| | | |
|---|---|---|
| 2 130 159 | 5/1984 | United Kingdom . |

OTHER PUBLICATIONS

Crow, S.C., "Stability Theory for a Pair of Trailing Vortices," *AIAA Journal*, vol. 8, No. 12, pp. 2172–2179. Dec. 1970.

Crow, S.C. et al., Panel Discussion, pp. 577–582 (1971).

Bilanin, A.J. et al., "Aircraft Wake Dissipation by Sinusoidal Instability and Vortex Breakdown," AIAA 11th Aerospace Sciences Meeting, Washington, D.C., Paper No. 73–107, Jan. 10–12 (1973).

Carbaugh, D. et al., "Wake Turbulence," *Airliner*, Jan.–Mar. Mar. 1995.

Crow, S.C. et al., "Lifespan of Trailing Vortices in a Turbulent Atmosphere," *J. Aircraft*, vol. 13, No. 7, pp. 476–482. Jul. 1976.

Crouch, J.D., "Instability and Transient Growth for Two Trailing–Vortex Paris," 35th Aerospace Sciences Meeting & Exhibit, Reno, Nevada, Jan. 6–10. Jan. 1997.

*Primary Examiner*—Theresa M. Wesson
*Attorney, Agent, or Firm*—Christensen O'Connor Johnson & Kindness

[57] ABSTRACT

An active control method and apparatus for encouraging the early destruction of trailing vortices formed by a lifting body having at least two control surfaces on each side and creating multiple vortex pairs is provided. The method includes actuating the control surfaces in a manner leading to the direct excitation of one or more of the Transient Growth Mechanism, the Short Wavelength Instability, the Long Wavelength Instability, and the Crow Instability to result in the accelerated breakup of the trailing vortices. A method of selecting control parameters in an active control system includes identifying the near-field vorticity distribution of the aircraft, selecting at least one amplification mechanism for distorting the trailing vortices, determining amplitudes and wavelengths for imposed vortex perturbations, simulating trailing vortex evolutions, determining effectiveness of perturbations and amplification mechanisms, determining vortex positions as a function of control surface deflections, and determining control parameters to govern the movement of the wing control surfaces.

12 Claims, 8 Drawing Sheets

ACTIVE SYSTEM FOR EARLY DESTRUCTION OF TRAILING VORTICES

RELATED U.S. APPLICATION DATA

This application claims the benefit of U.S. Provisional Application Ser. No. 60/050,807 filed Jun. 26, 1997.

FIELD OF THE INVENTION

This invention relates to a method and apparatus for addressing aircraft trailing vortices. Airplanes create trailing vortices (rotations of air), due to pressure differences between the upper and lower surfaces of its lifting surfaces (e.g., wings, elevators, etc.) This effect has been called "wake turbulence", "propwash", and the vortices "wake vortices", "tip vortices" or "trailing vortices".

BACKGROUND OF THE INVENTION

For large aircraft, a wake of rotating air is created behind the craft during flight. These vortices and their associated downflow (airflow located between the vortices) and upflow (airflow located outside the vortices) can disrupt the flight of a following aircraft that enters the wake of the leading aircraft. Depending on the conditions, structural stresses can be imposed on the following aircraft. In some instances, the following aircraft can be rapidly rolled to one side, which is particularly hazardous when flying close to the ground. The problems associated with wake vortices become more pronounced as the lead aircraft increases in size relative to the following aircraft.

While the trailing vortices are almost always moved or destroyed by atmospheric currents, or spontaneously descend away from the flight paths, these effects do not guarantee that hazardous encounters will never occur. Several accidents have been attributed to wake turbulence. To alleviate this risk, a number of regulatory flight rules are in effect which require compliance in the amount of spacing between airplanes in approach to the same airport. The wake turbulence spacing requirement is often larger than the spacing required by other factors such as radar resolution or runway occupancy, so that under some conditions, these rules add to the congestion and delays in the air transportation system.

Starting around 1970, theories regarding the alleviation of wake vortices have been the subject of a number of professional conferences. The inventors herein are not aware of any such theory having been applied directly to a system for use with commercial airliners. Prior attempts to manage the trailing vortices in the commercial aircraft industry have focused on methods of modifying the vortex characteristics to alleviate (or reduce) the potential for upset on the following aircraft. Methods of this type provide a modification of the vortex structure, but such modification does not significantly alter the induced rolling moments on a following aircraft unless the following aircraft wing span is comparable to the vortex-core diameter. Typically, the vortex-core diameter is much smaller than the leading aircraft wing span. This type of system has been the subject of a large number of patents. Some of these are summarized in U.S. Pat. No. 5,492,289.

One of the dominant mechanisms affecting the persistence of the vortices is instability. Methods to excite a sinusoidal instability for a single pair of trailing vortices that could lead to a breakup of the vortices have been suggested. The growth of such instabilities would ultimately lead to large vortex distortions and eventual breakup. This idea was first analyzed by S. C. Crow in Crow, S. C., *Stability Theory for a Pair of Trailing Vortices,* AIAA Journal, 8, pp. 2172–2179 (1970) [hereinafter referred to as Crow (1970)]. A system of this type was suggested by Crow as documented in Crow, S. C, *Panel Discussion in: "Aircraft Wake Turbulence and Its Detection,"* ed. J. Olsen, A. Goldburg, M. Rogers, pp. 551–582 (1971) [hereinafter referred to as Crow (1971)].

The predictions of Crow as to the most naturally-amplified wavelengths are in good agreement with experimental results where the natural source of excitation is provided by turbulence in the atmosphere. This source of breakup is referred to as the Crow Instability, and is well-known in the art. The Crow Instability amplifies slowly. The growth of the instability leads to periodic linking of the vortices from the right and left hand sides, in the flight-path direction in the far field. The linking transforms the vortices into vortex rings, which after some additional time, become sufficiently deformed to break up. In this final state of evolution, the impact of the vortices on a following aircraft can be considered benign.

The concept of directly exciting the Crow Instability was tested in towing-tank experiments reported in Bilanin, A. J. & Widnall, S. E., *Aircraft Wake Dissipation By Sinusoidal Instability and Vortex Breakdown,* AIAA Paper No. 73–107 (1973) [hereinafter referred to as Bilanin & Widnall]. The experiments showed that the instability could, in fact, be excited by varying the distribution of lift on the wing. A fuller presentation of the concept of direct excitation of the Crow Instability is given in the paper Crow, S. C. & Bate, E. R. Jr. 1976 *Lifespan of Trailing Vortices In a Turbulent Atmosphere,* J. Aircraft, 13, pp. 476–482 (1976) [hereinafter referred to as Crow & Bate].

Figure 1A:
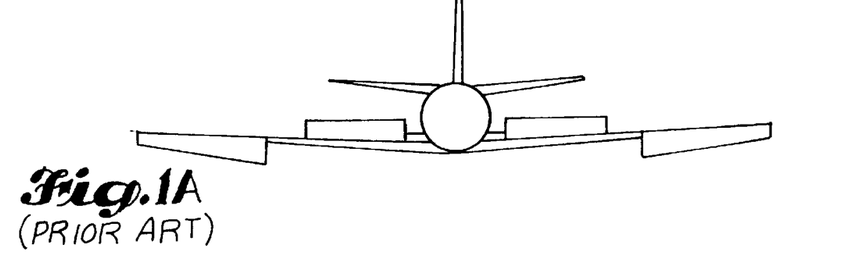
FIG. 1A is a front view of a prior art aircraft showing a number of control surfaces in deflected positions.
Figure 1B:
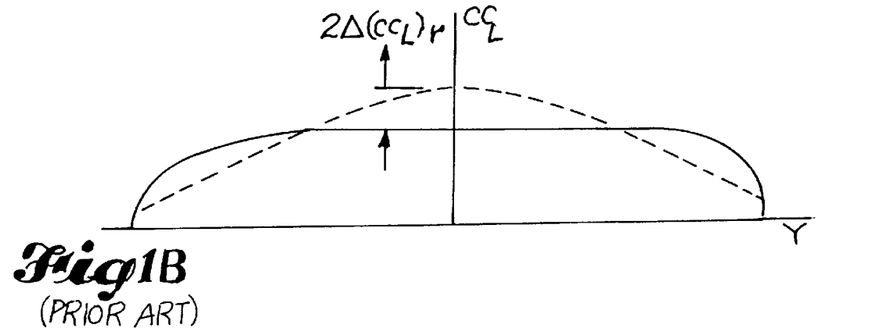
FIG. 1B is a diagram of spanwise lift variation as suggested by Crow & Bate.

The work of Crow & Bate represents the state-of-the-art of methods to excite a sinusoidal instability at the time of development of the current invention. It was suggested that the excitation would be accomplished by varying the distribution of lift on the wing in a particular manner. As stated in Crow & Bate, "The aircraft controls are wired so that the outboard ailerons can oscillate symmetrically, whereas the inboard ailerons move in opposition to keep the total lift of the wing constant. -The horizontal stabilizer trims any pitching tendency, and the net effect is to slosh the lift distribution in and out along the wingspan." Id. at pages 481. This concept is illustrated by FIGS. 1A and 1B herein labeled "Prior Art" and is taken directly from figure 10 of the Crow & Bate paper. FIG. 1A is a schematic of the control surfaces in their deflected positions. FIG. 1B shows a schematic of the wing spanload lift variation as suggested by Crow & Bate (the fuselage is not shown, but would be positioned at the center location of the x-axis.) The extreme of sloshing the lift outboard is given by the solid line, and the extreme of sloshing the lift inboard is given by the dashed line. The areas represented under the solid and dashed lines is the same, indicating that the two spanloads provide the same total airplane lift. However, the trailing vortices do not have the same strength (circulation) and location.

Figure 1C:
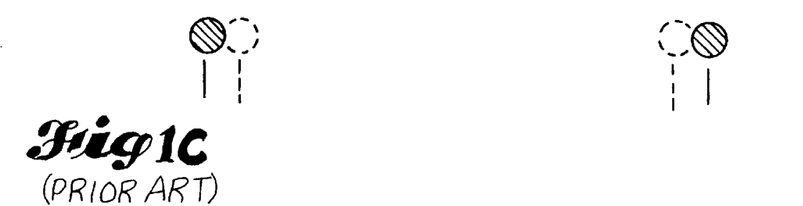
FIG. 1C is a diagram of the vortex positions (shown as circles) and the vorticity centroid positions (shown as straight lines) resulting from the lift variations of FIG. 1B.

The centers of wake vorticity, called "vorticity centroids", are shown in FIG. 1C, where the dashed and solid circles correspond to the dashed and solid lines of FIG. 1B. Vorticity centroids are the centers of rotation for the combined vortices of one wing side, i.e., left and right vorticity centroids are shown in FIG.1C. Thus, FIGS. 1A, 1B, and 1C demonstrate that an inboard perturbation of a single vortex pair may be introduced by shifting the spanload lift (and hence the vorticity centroids) between the solid and dashed lines. In FIG. 1C, the circles represent the positions of each vortex and the lines represent the vorticity centroids on that side of the aircraft. Because the Crow Instability is theorized for only a single vortex pair, the centroids align with their respective vortex.

Figure 1D:
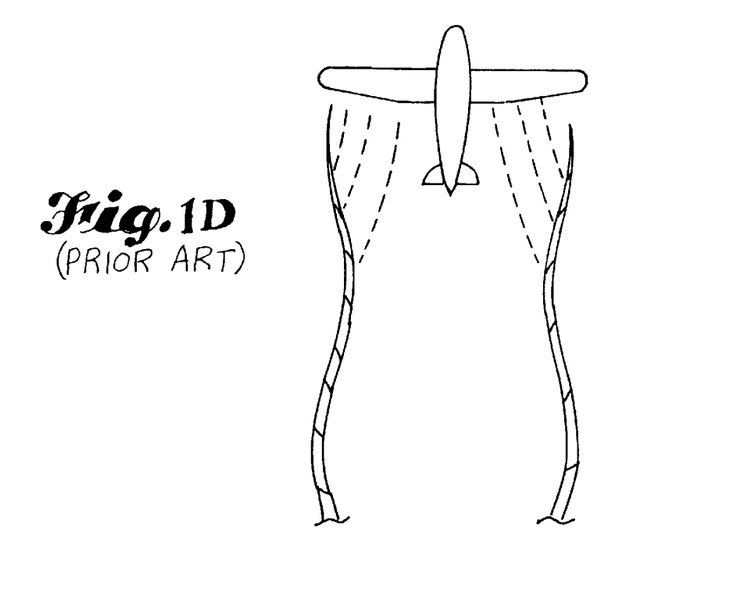
FIG. 1D is a top down plan view of an aircraft illustrating the near field effects of varying the lift as suggested in FIG. 1B using the control surfaces of FIG. 1A.

Referring to FIG. 1D, the vortices resulting from oscillating the lift distribution take on a sinusoidal form. The wavelength of the imposed perturbation is generally about seven wing spans (for maximum amplification due to the Crow Instability.) The vortex movements shown in FIG. 1D have been exaggerated.

As shown in FIG. 1C, significant movement of the vorticity centroids between the dashed and solid line positions for both the right and left hand sides is required to break up the vortices via direct excitation of the Crow Instability. To preserve the total lift while moving the vorticity centroids, the wing-root loading must also undergo significant variation, since the lift required from the wing-root is now much greater (see lift "hump" at the middle of the x-axis). Increased loading at the wing tip is also structurally problematic for many aircraft. Any necessary structural enhancements can lead to increased weight and fuel consumption which lower the efficiency of the craft.

The size of the initial vortex perturbation is a function of the amount of lift that is shifted along the wingspan. Thus, a large initial perturbation results in a large loss in lift from the baseline (steady-state) wing configuration. In order to break up the vortices within a distance behind the aircraft that could influence aircraft spacing, using the current approach (i.e., the approach of Crow & Bate) would require a large initial perturbation and an excessive loss in baseline wing lift. Because of the slow growth of the Crow Instability, the required excitation levels for rapid breakup of the vortices are too large to be useful for practical application. Indeed, the concept of Crow & Bate was never applied in practice.

Thus, a need exists for a practicable method and system or device for bringing about the dissipation of wake vortices by inserting a perturbation in the wake vortices that eventually causes the effective breakup of the vortices. The present invention is directed to fulfilling this need.

SUMMARY OF THE INVENTION

In accordance with teachings of the present invention, a method of encouraging the early destruction of trailing vortices formed by a lifting body which produces at least two trailing vortex pairs is provided. The method includes actuating the control surfaces in a manner leading to the direct excitation of one or more of the Transient Growth Mechanism, the Short Wavelength Instability, and the Long Wavelength Instability, to result in the accelerated breakup of the trailing vortices. In preferred embodiments, the excitation is the result of some combination of a Short Wavelength Instability, a Transient Growth Mechanism, and the Crow Instability amplification as exists on at least two vortex pairs.

In accordance with other aspects of this invention, the actuating is accomplished by a controller in electronic communication with at least two sets of control surfaces of the lifting body. The controller includes a memory such that the appropriate control surface movements are determined by accessing a table stored in the controller memory.

In accordance with further aspects of this invention, the lifting body includes aircraft wings that produce at least two vortex pairs from the wings. Actuation of the control surfaces is accomplished during airport approach and/or departure. In another preferred embodiment, the actuating of the control surfaces does not significantly alter the total airplane lift or pitching moment. In preferred embodiments, the lifting body is an aircraft wing having an aileron and a spoiler, and the actuating of control surfaces includes moving the ailerons and moving the spoiler. In alternative embodiments, the wing has an aileron and a flaperon, and the actuating includes moving the ailerons and the flaperon. In yet another preferred embodiment, the lifting body is a submarine with lifting surfaces that produce at least two vortex pairs.

In accordance with yet other aspects of this invention, a method of selecting control parameters in an active control system for the early destruction of trailing vortices formed by a lifting body which produces at least two vortex pairs is provided. The lifting body has at least two sets of control surfaces. The method includes identifying the near-field vorticity distribution of the aircraft; selecting at least one amplification mechanism for distorting the trailing vortices; determining amplitudes and wavelengths for imposed vortex perturbations; simulating trailing vortex evolutions; determining effectiveness of perturbations and amplification mechanisms; determining vortex positions as a function of control surface deflections; and determining control parameters to govern the movement of the wing control surfaces.

In accordance with yet further aspects of this invention, the identification of the near-field vorticity distribution includes performing a wind tunnel survey of a model representative of the aircraft. The selection of at least one amplification mechanism includes determining whether distinct vortex pairs exist. The determination of amplitudes and wavelengths includes performing a stability analysis. The determination of the effectiveness of perturbations and amplification mechanisms includes determining whether vortex breakup is achieved within a useful following distance. The determination of vortex positions as a function of control surface deflections includes performing a wind tunnel survey of a model representative of the aircraft.

In accordance with additional aspects of this invention, an apparatus for early destruction of trailing vortices for aircraft configurations having at least two vortex pairs is provided. The aircraft further includes left and right wings, each wing having at least two control surfaces. The apparatus includes means for identifying the near-field vorticity distribution of the aircraft; means for selecting at least one amplification mechanism for distorting the trailing vortices; means for determining amplitudes and wavelengths for imposed vortex perturbations; means for simulating trailing vortex evolutions; means for determining effectiveness of perturbations and amplification mechanisms; means for determining vortex positions as a function of control surface deflections; and means for determining control parameters to govern the movement of the wing control surfaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The method of Crow & Bate (as well as Crow (1971) and Bilanin & Widnall) was based on modeling the trailing vortices as a single vortex pair—a right-hand side vortex and a left-hand side vortex. For such a system, the significant growth mechanism to be exploited is the Crow Instability. This is the growth mechanism which is exploited in the schemes described in Crow (1971), Bilanin & Widnall, and Crow & Bate. From a practical point of view, the Crow Instability amplifies perturbations very slowly. For example, it takes roughly ninety wingspans behind a Boeing 747-400 for an initial perturbation to grow by a factor of ten due to the Crow Instability. For practical commercial applications, an amplification factor greater than ten is desired.

Figure 2A:
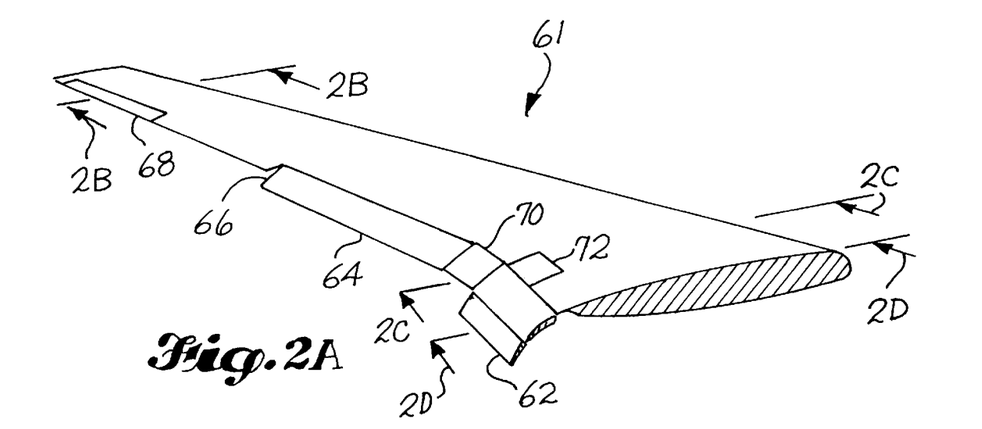
FIG. 2A is a perspective view of an airplane wing with flaps down.
Figure 2B:
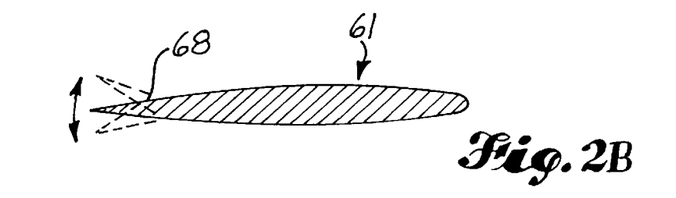
FIGS. 2B–2D are cross-sectional side views of the wing of FIG. 2A taken at the aileron, flaperon, and inboard flaps, respectively.
Figure 2C:
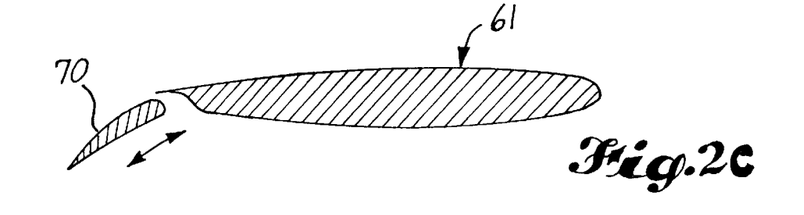
Figure 2D:
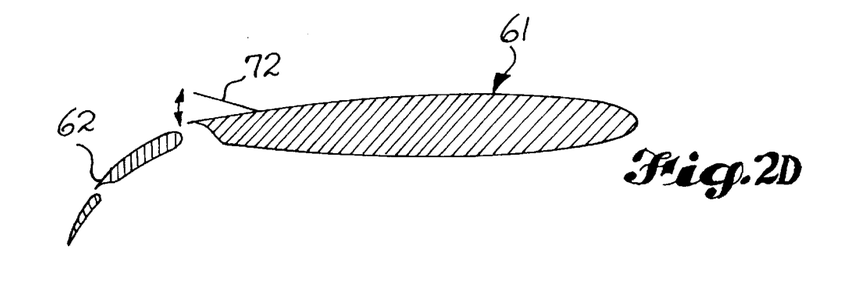
Figure 3A:
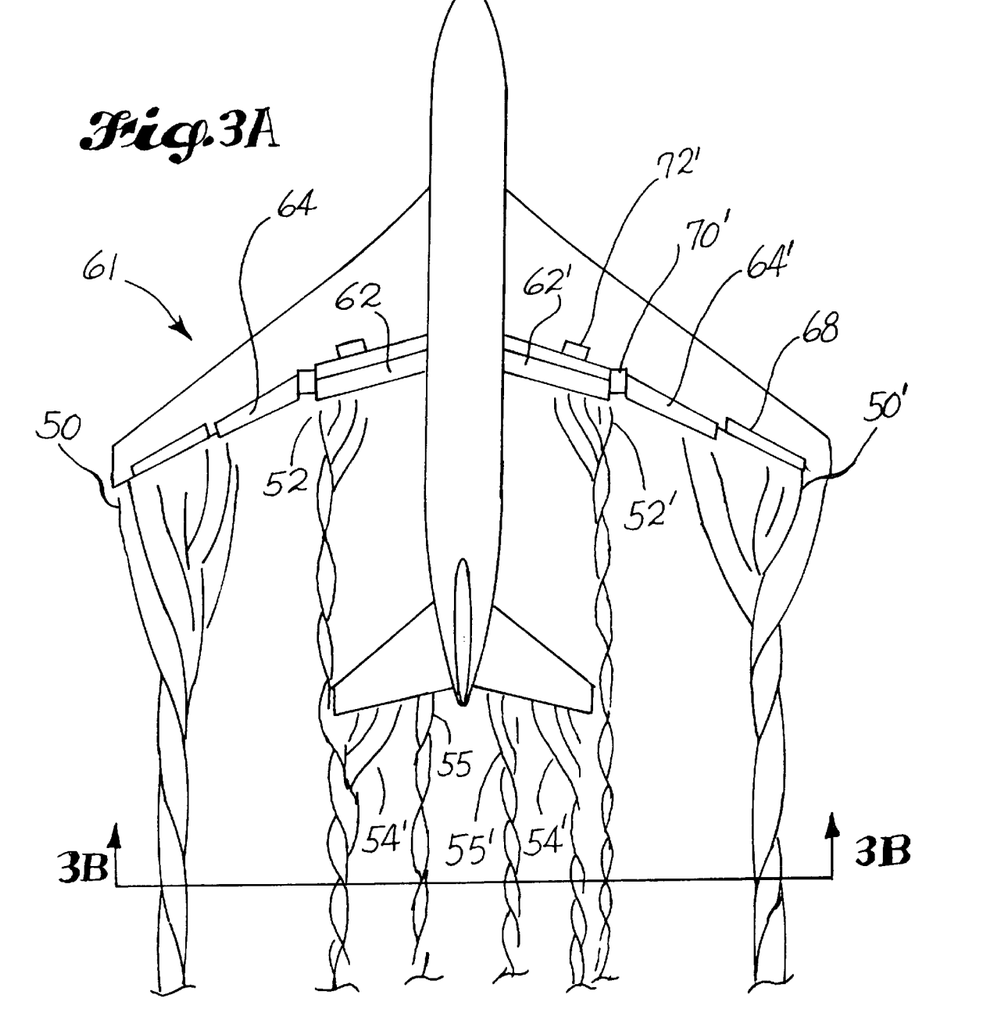
FIG. 3A is a top down plan view of an airplane showing various vortices.

The analysis used by Crouch and discussed in Crouch, J. D. *Stability of multiple trailing-vortex pairs,* In: *The Characterization and Modification of Wakes From Lifting Vehicles in Fluids,* pp. 17/1–8, AGARD CP-584 (1996) [hereinafter referred to as Crouch 1996] is based on the discovery that certain aircraft vortex systems can be modeled as at least two pairs of wing trailing edge vortices—one pair forming from the left and right wing tips, the other pair forming from the left and right outboard edges of the inboard flaps. Referring to FIG. 2A, a representative wing 61 includes double-slotted inboard flaps 62, single-slotted outboard flaps 64, outboard ailerons 68, flaperons 70 located between the inboard flaps 62 and the outboard flaps 64, and inboard spoilers 72 positioned forward of the inboard flaps 62. Similar components (i.e., 62', 64', 66', 68', 70', 72') are provided for the right side aircraft wing, as shown in FIG. 3A. FIGS. 2B–2D illustrate typical movements of the outboard ailerons 68, flaperons 70, and inboard spoilers 72, respectively.

Figure 3B:
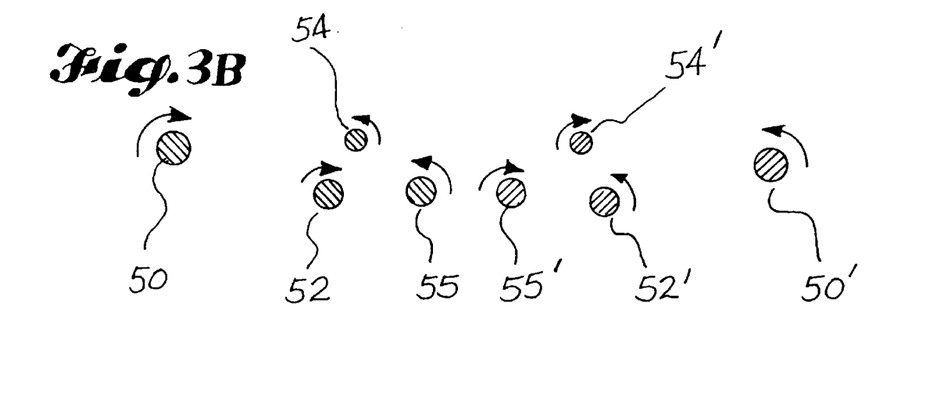
FIG. 3B is an end-view taken along lines 3B—3B in FIG. 3A.

Referring to FIG. 3A, the aircraft configuration that includes the wing of FIG. 2A with flaps down produces a pair of wing-tip vortices 50, 50', a pair of inboard flap-edge vortices 52, 52', a pair of horizontal-tail vortices 54, 54', and a pair of side-of-body vortices 55, 55'. The pair of inboard flap-edge vortices 52, 52' are formed at the outboard edges of the inboard flaps due to the drop in spanload between the inboard flaps 62, 62' and the outboard edges of the outboard flaps 64, 64'. Shown in FIG. 3B is an end-view taken along lines 3B—3B in FIG. 3A. The arrows surrounding the vortices show the direction of vortex rotation. Depending on the particular configuration, some of the vortex pairs may propagate to the aircraft centerline and merge, thus effectively canceling each other as well as changing the total circulation produced on a given side of the aircraft. Other vortex pairs within the system persist for many spans behind the aircraft.

When modeled as multiple trailing-vortex pairs, the present inventor Crouch has discovered two new mechanisms leading to growth with time. These are termed herein a Transient Growth Mechanism and a Short Wavelength Instability. The present inventor Crouch has additionally discovered an instability that appears to be a modification of the Crow Instability. This instability is termed herein a Long Wavelength Instability. These new mechanisms are used in the present invention to amplify initial airflow irregularities. This amplification leads to a more rapid elimination of the trailing vortices than previously known using the Crow Instability. In particular, one embodiment of an active control system for early destruction of trailing vortices formed in accordance with the present invention is provided and described below with reference to FIG. 5. The active control system uses existing aircraft wing control surfaces to introduce particular perturbations in the airflow that is passing from the wing trailing edge. A combination of one or more of the instabilities described herein amplify these perturbations. This results in rapid dissipation of the vortices as they begin to overlap and lose structure.

Figure 4A:
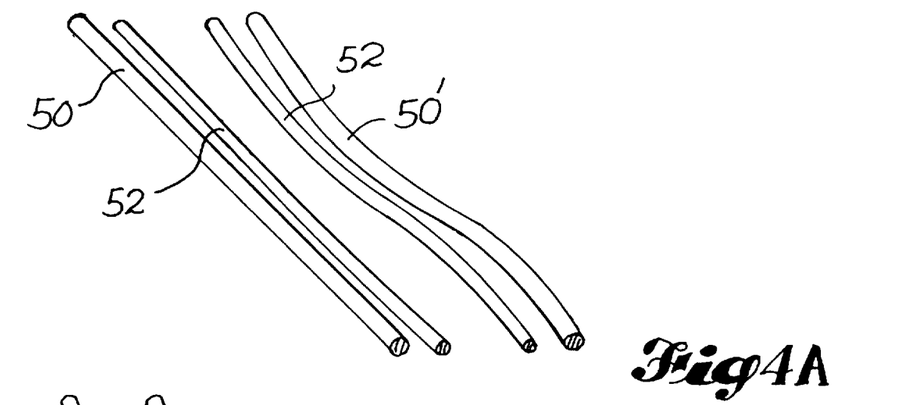
FIGS. 4A–4C are perspective views of two distorted vortex pairs after amplification of an initial disturbance using the Long Wavelength Instability, the Transient Growth Mechanism, and the Short Wavelength Instability, respectively.
Figure 4B:
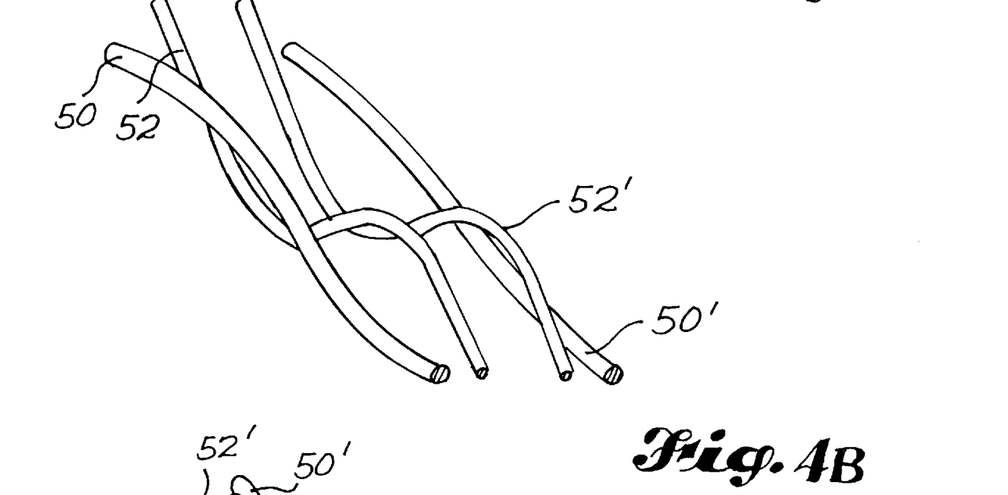
Figure 4C:
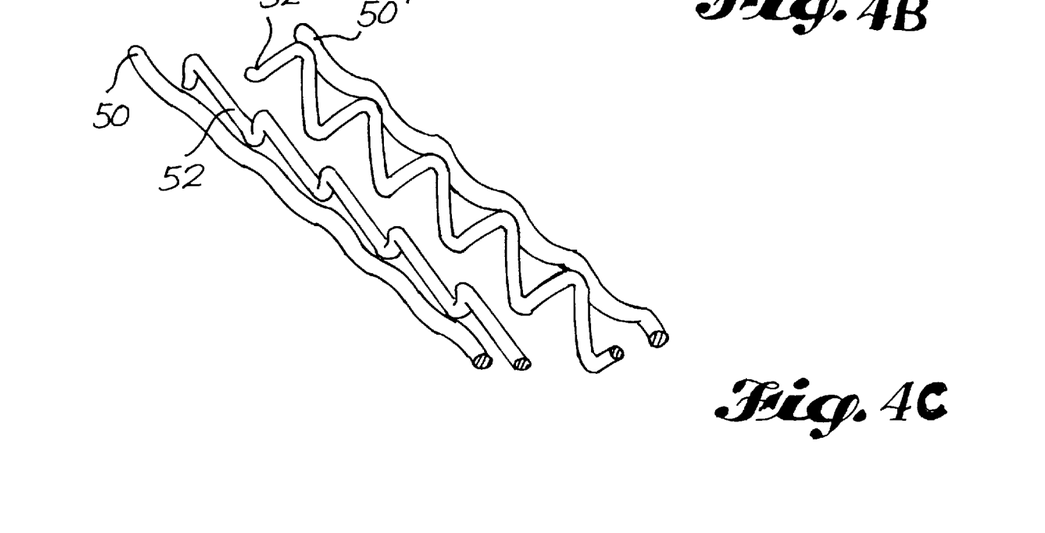

The result of using some combination of the Long Wavelength Instability, the Transient Growth Mechanism, the Short Wavelength Instability, and the Crow Instability to amplify initial vortex perturbations is significant. FIGS. 4A–4C show exaggerated positions of two distorted wing trailing vortex pairs (50, 50' and 52, 52') after amplification of initial disturbances using the Long Wavelength Instability, the Transient Growth Mechanism, and the Short Wavelength Instability, respectively. For purposes of the discussion below, a longitudinal direction is defined as being the fore and aft direction of travel of an aircraft. A lateral direction is defined as being a direction perpendicular to the longitudinal direction. The vortex pairs are illustrated after they have descended a distance of approximately one half of a wing span (equal to one tumbling period for these conditions.) Each illustration includes at least one wavelength. The magnitude of the initial perturbation was the same for each set of vortices, only the wavelength (excitation frequency) and the lateral direction of the initial perturbation was varied in order to best illustrate the effect of a particular instability.

After introducing an appropriate initial perturbation in the wing vortices of FIG. 2A, the effect of the Long Wavelength Instability is shown in FIG. 4A. Initially, the outboard flap or wing tip vortices 50, 50' are each perturbed in a direction upward and away from the airplane centerline. The inboard vortices 52, 52' are perturbed in the same form and in-phase with the outboard vortices. As the vortices continue behind the aircraft, the vortices on the wing left hand side (i.e., vortices 50 and 52) rotate relative to one another about a generally longitudinal axis. Similarly, the vortices on the wing right hand side (i.e., vortices 50' and 52') also rotate relative to one another about a generally longitudinal axis. The rate of rotation for the left and right hand pairs depends on the strength and spacing.

After introducing an appropriate initial perturbation in the wing vortices of FIG. 2A, the effect of the Transient Growth Mechanism is shown in FIG. 4B. Initially, the outboard flap vortices 50, 50' are each perturbed in a. direction upward and away the airplane centerline. In this case, the inboard vortices are unperturbed.

After introducing an appropriate initial perturbation in the wing vortices of FIG. 2A, the effect of the Short Wavelength Instability is shown in FIG. 4C. The movement is similar to that in FIG. 4A, except at much shorter wavelengths and the inboard and outboard vortices are perturbed out of phase.

Figure 5:
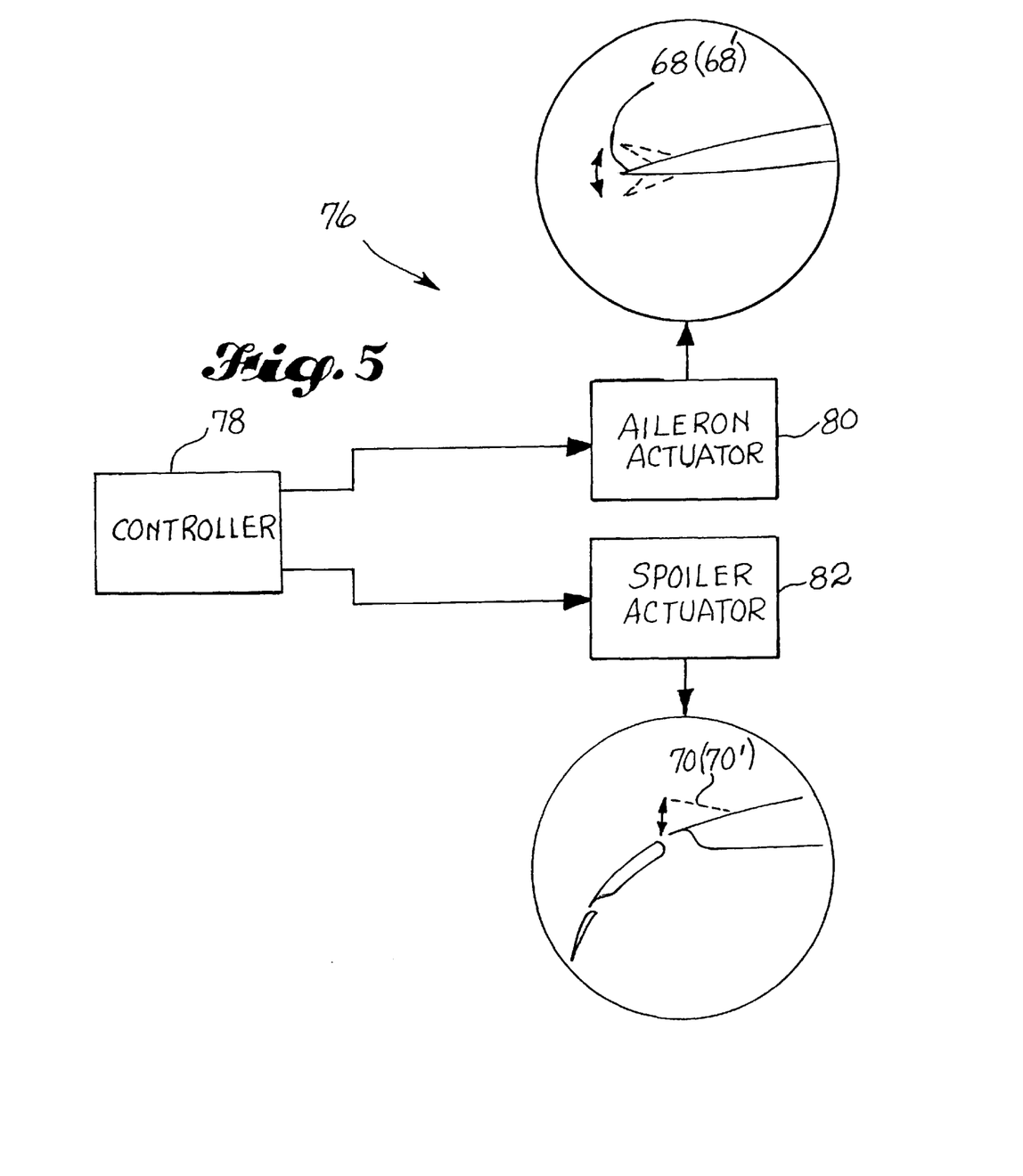
FIG. 5 is a schematic diagram of one embodiment of an active control system for destruction of trailing vortices formed in accordance with the present invention.

As will be appreciated by those skilled in the art in comparing FIGS. 4A–4C, the present invention exploits these new instabilities that are associated with multiple vortex-pair systems to breakup the vortices faster, and with less impact to the vortex-producing aircraft, than could be achieved by exploiting only the Crow Instability. It is calculated that the Short Wavelength Instability can amplify an initial perturbation by a factor of ten in approximately fifty-six wing spans behind a Boeing 747-400 (i.e., only 60% of the distance required for similar amplification due to Crow Instability.) The Transient Growth Mechanism is strongest at longer wavelengths and is calculated to amplify an initial perturbation by a factor of ten in less than thirty wing spans behind a 747-400 (i.e. roughly 30% of the distance required for comparable amplification due to the Crow Instability.) Referring to FIG. 5, the active control system 76 for early destruction of trailing vortices includes a controller 78 in communication with at least two control surfaces via their respective actuation assemblies. In FIG. 5, the lifting body is an aircraft wing, the control surfaces are the ailerons 68, 68' and spoilers 72, 72', the actuation assemblies are an aileron actuator 80 and a spoiler actuator 82, and the controller is a digital computer. Other control surfaces may be used depending on the configuration of the lifting body to which the present invention is being applied. Likewise, other lifting bodies, such as submarines, may benefit from use of the present invention. The controller is dedicated to the active control system, or alternatively is formed from an existing control component, e.g., an autopilot system or flight management computer.

Still referring to FIG. 5, the controller introduces perturbations into the aircraft wing trailing vortex pairs by moving the aileron and spoiler in a manner that is best amplified by one or more instabilities. Amplification of the perturbations, in turn, decreases the distance required for the vortices to self-destruct. The controller causes the ailerons and spoilers to rotate about their connections to the wing in a pre-defined manner. The control surface motion is preferably a waveform, having both a specific frequency and amplitude. The aileron rotation includes positions that are both above the wing upper surface and below the wing lower surface. In contrast to the ailerons, the spoiler can only move to positions above the wing upper surface.

The pre-defined motions for the control surface movement are preferably stored in a computer memory. The information is determined in the system design phase for a particular airplane configuration and is organized in table format, so that during use, the processing components of the controller can extract the appropriate control surface motion based on the aircraft's current flight conditions, e.g., airspeed, altitude, attitude, flap setting, etc. One method of determining values for the stored information is presented below with respect to FIG. 7. By continuously monitoring the flight conditions, the active control system can direct and re-direct the motion of the control surfaces as required by current conditions.

Figure 6A:
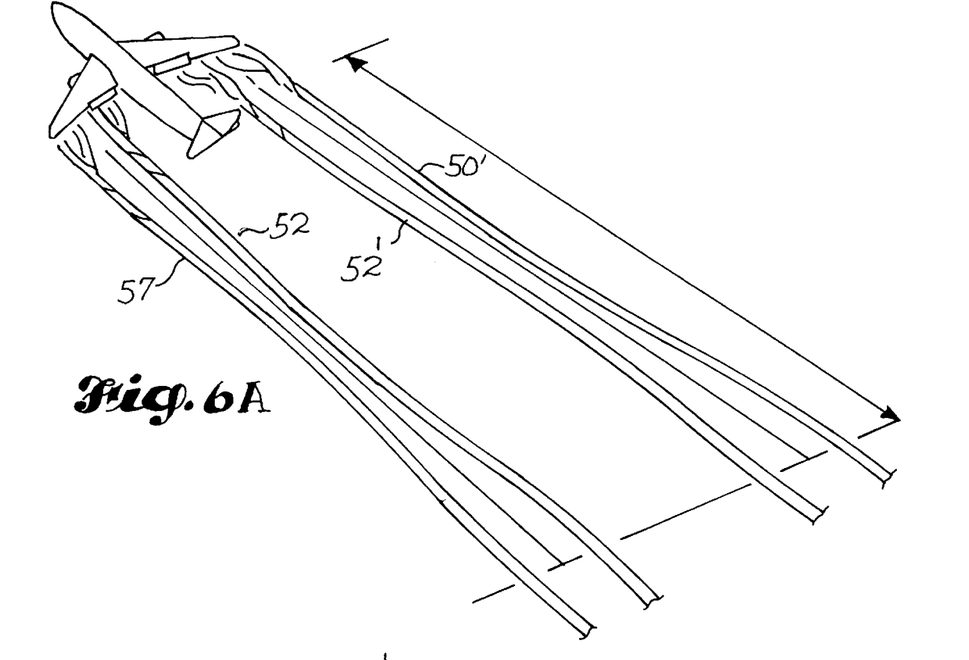
FIG. 6A is a perspective view of wing-tip and flap-edge vortices with an imposed perturbation according to the active control system of FIG. 5.

FIG. 6A shows the wing-tip and flap-edge vortices with an imposed perturbation. The tail vortices and the helical rotation of the wing vortices are not shown for clarity. The wing tip and flap vortices on a given side of the aircraft are perturbed toward and away from one another in the spanwise direction. The level of perturbation for each vortex is scaled inversely with its circulation strength.

Figure 6B:
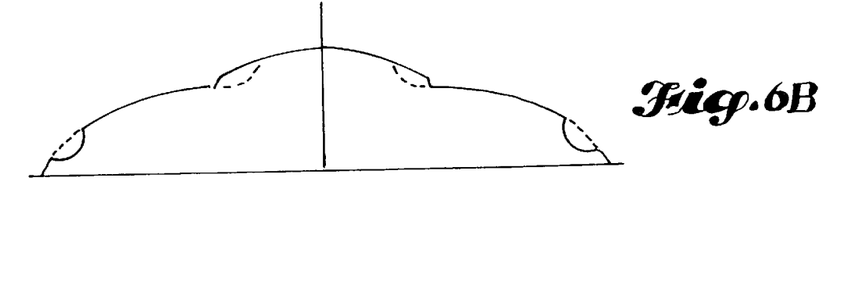
FIG. 6B is a diagram of spanwise lift variation resulting from the active control system illustrated in FIG. 5.

The motion of the control surfaces generally affects the lift distribution for the wings as shown in FIG. 6B. The two spanloads provide the same total airplane lift. As will be appreciated by viewing FIG. 6B, the inboard flaps are held at a constant orientation, thus keeping the lift constant at the wing root. Instead, the lift distribution is affected primarily at the transition locations between the aileron and outboard flaps, and above the spoiler over the inboard flaps.

Figure 6C:
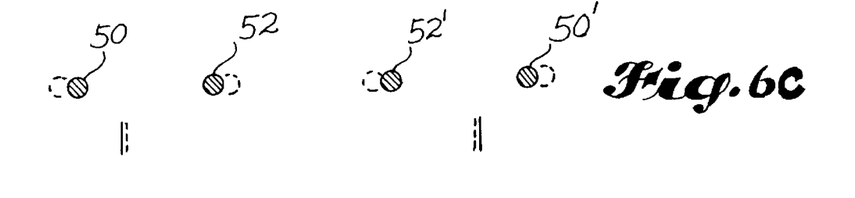
FIG. 6C is a diagram of the vortex positions (shown as circles) and the vorticity centroid positions (shown as straight lines) resulting from the lift variations of FIG. 6B.

Referring to FIG. 6C, shifting the lift distribution moves the inboard flap and wing tip vortices 52, 52' and 50, 50' between the dashed and solid lines. The net effect of this motion for the near field vorticity distribution is to introduce a spatially periodic perturbation to the vortex positions. The wavelength of the induced perturbation is set by the frequency of the oscillation and the velocity of the airplane. The form of the spatial perturbation is chosen to provide an excitation of one of the natural growth mechanisms which rapidly amplify the perturbations into large distortions of the vortices.

In FIG. 6C, the vortex positions are shown as circular lines and the vorticity centroids are shown as vertical lines. The dashed lines are the result of the ailerons being lifted up while the flaperons (or spoilers) are down; the continuous lines are the result of the ailerons being down while the flaperons (or spoilers) are up. As will be appreciated from viewing FIG. 6C, the combined effect of perturbing both sets of wing vortex pairs results in minimal shifting of the vorticity centroids. Therefore, the total lift is preserved without significant variation in the wing-root loading.

In designing an active control system, the vortex pairs from the wing tips, inboard-flap edges, and horizontal tail are preferably the minimum number of vortices that should be used to model the trailing vortices in the near field behind an aircraft. The tail vortices are not shown in FIGS. 6A–6C for illustrative clarity. The tail vortices are moved only as necessary to keep the airplane lift and pitching moment constant. Because the tail vortices are relatively weak and their perturbations are small, they do not significantly affect the vorticity centroid locations. In this regard, no particular instability is used to define tail motion.

Figure 7:
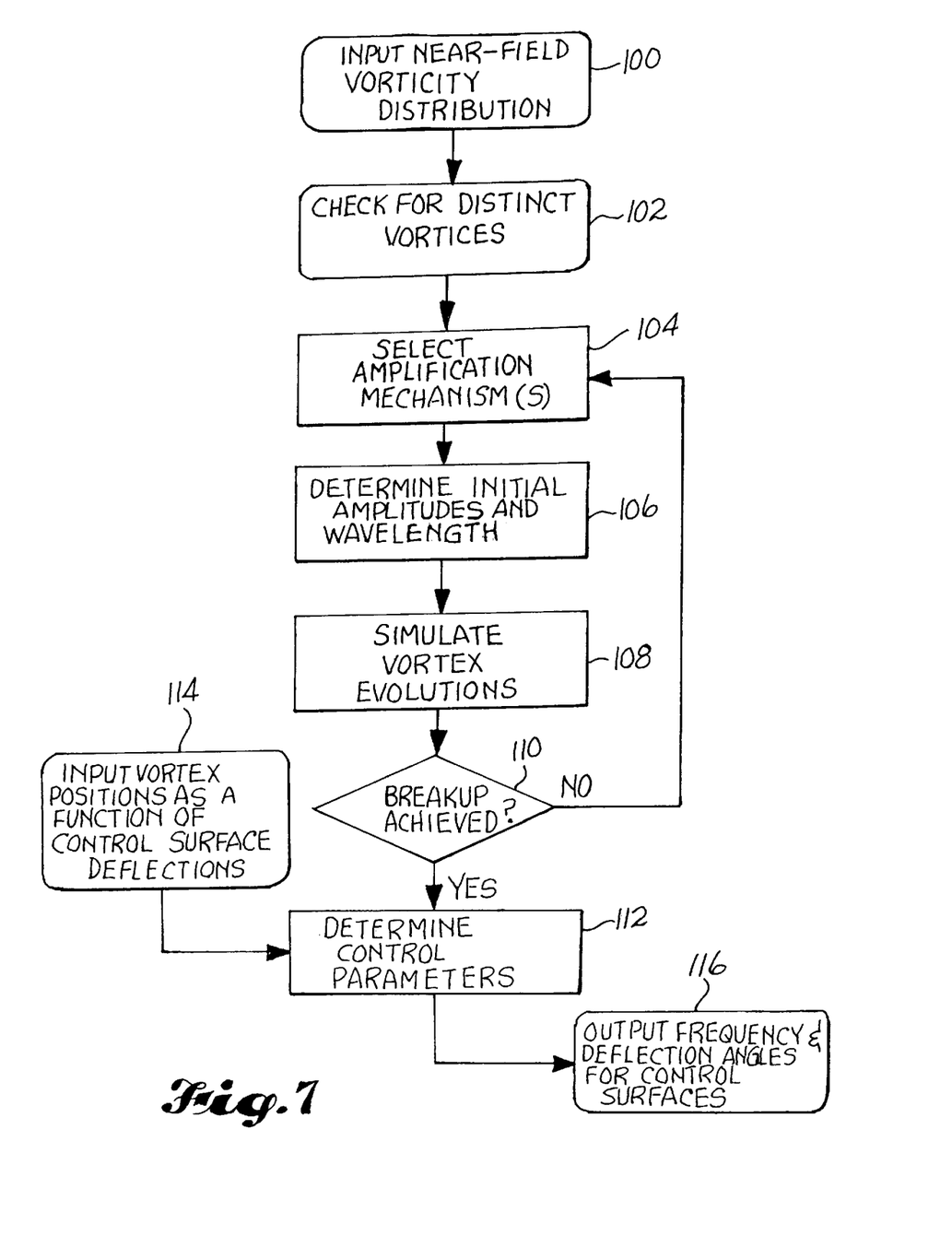
FIG. 7 is a logic diagram of a method of defining control surface movement for use in the active control system of FIG. 5.

Referring to FIG. 7 is a logic flow diagram of one method of pre-defining the optimal control surface movements for the active control system. Again, the method is described with reference to an aircraft. The present invention, however, may be used with other vehicles and other types of control surfaces.

Starting at step 100, a designer first obtains data on the near-field vorticity distribution for the subject aircraft during flaps down flight. This information is preferably obtained by conducting one or more wind tunnel tests. Alternatively, this information may be obtained computationally. During these tests, the velocity of airflow at different aft wing locations is measured and recorded. The far field distribution is calculated theoretically from the near field information. In the near field, the airflows coming off the wing trailing edge are in the form of sheets that are quickly rolled into tubular shapes. By measuring the near field vorticity, a designer can draw theoretical conclusions on the location and strength of vorticity in the mid and far fields. It is possible to measure the mid field distribution as seen in the wind tunnel and manipulate the results as appropriate, however, this is not the preferred approach. Each aircraft type will have its own unique distribution. The data is preferably stored in a digital computer for analysis and manipulation.

After having obtained the near field vorticity distribution, verification is made as to the existence and persistence of multiple distinct trailing-vortex pairs at step 102. In reviewing the wind tunnel distribution, areas of high velocity-gradient airflow will generally represent compact regions of vorticity. If the configuration has inboard-flap vortices that are significant (greater than approximately 25% of the tip vortex strength) and persistent (remaining distinct for approximately one rotation with the tip vortex), the active system may be most effectively applied. For typical configurations, the strength of the inboard-flap vortices is approximately 40–50% of the strength of the tip vortices. Each tip vortex is a combination of vortices originating at the wing tip and at the end of the outboard flap. The persistence of multiple vortices depends largely on the relative position of the in-board flap vortices and the vortices produced by the tail. If the distance between the two tail vortices is less than the distance between the two inboard-flap vortices, the flap vortices are likely to persist.

Assuming their existence, the next step is to select the growth mechanisms to be exploited, shown at item 104. In FIG. 7, this step is characterized more generally as the selection of "amplification mechanism(s)." This may include any combination of the instabilities described above and/or in conjunction with any previously known mechanism, such as the Crow Instability. The selection is based on how long the tail vortices persist, how long the flap and tip vortices remain distinct, the relative strength of the vortices, as well as other factors known to those skilled in the art. The objective is to select those mechanisms that will best amplify perturbations present in the vortices, to rapidly cause the vortex pairs to pinch.

It is preferable that the amplification mechanisms to be exploited be chosen based on the expected persistence of the different vortex pairs, based on a stability analysis of the vortex system, and based on a simulation of the vortex evolutions. If both the flap and tail vortices persist (i.e., they are not carried to the centerline), then the Long Wavelength Transient Growth Mechanism is the preferred candidate. If there is not sufficient amplification to cause breakup before the vortices merge, the breakup will occur indirectly through a combination of the Transient Growth Mechanism (for the multiple-vortex pair system) followed by additional amplification due to the Crow Instability (for the single vortex pair which remains after merger). This is the case for the example shown in FIG. 8A in which the configuration forms a wing tip vortex pair 50, 50', inboard flap edge vortex pair 52, 52', and horizontal tail vortex pair 54, 54'.

If the flap vortices persist, but the tail vortices are carried to the centerline and destroyed, then the Transient Growth Mechanism and/or the Short Wavelength Instability are preferred candidates. For cases in which the flap and tip vortices merge before a complete rotation period, the superposition of the Long Wavelength Instability and the Short Wavelength Instability is a preferred candidate. For cases in which the flap and tip vortices remain distinct longer than one rotation period and they have comparable strengths, the Short Wavelength Instability is the preferred candidate.

In general, when the Transient Growth Mechanism is combined with the Crow Instability, the initial perturbation amplitudes required to breakup the vortices at a given distance behind the aircraft are smaller than required when only the Crow Instability is exploited. Thus, a unique feature of the present invention, in this context, is the use of the Transient Growth Mechanism to reduce the level of the initial perturbation or, for a given level of initial perturbation, to reduce the distance to breakup.

Still referring to FIG. 7, control surface amplitudes and wavelengths for the imposed vortex perturbations are determined at step 106. Once the growth mechanisms are identified, the initial control surface waveforms are determined. For the example configuration of FIG. 3A, this preferably includes determining the frequency of oscillation for the aileron and the spoiler, the amplitudes of their deflections, and the "shape" of the excitation functions (i.e. how the control surface positions vary over the oscillation period).

The control surface frequency is selected to provide a perturbation of a given wavelength $\lambda$. The wavelength to be imposed on the vortex system depends on the growth mechanism to be exploited, on the spacing between the flap and tip vortices, on the relative strength of the flap and tip vortices, and on the effective core size of the vortices. For a given configuration, the wavelength is chosen to maximize the growth leading to breakup of the vortices. The potential range of the wavelength is given roughly by:

$$2b \leq \lambda \leq 12b,$$

where b is the aircraft wingspan.

The term "Long Wavelength" refers roughly to wavelengths $\lambda > 5b$. The preferred long wavelength which provides maximum instability growth is $\lambda \approx 7b$. The term "Short Wavelength" refers roughly to $\lambda < 5b$. The preferred short wavelength to provide maximum instability growth depends on the core size of the vortices. This can be determined theoretically using experimentally-measured vortex-core sizes, or it can be determined empirically by measuring the amplification for a given configuration. An example superposition of long and short wavelengths would be the combination of $\lambda = 2.5b$ and $\lambda = 7.5b$.

For a given wavelength $\lambda$, the oscillation frequency (in Hertz) is given by:

$$f = V_A / \lambda$$

where $V_A$ is the aircraft speed (in feet per second) and $\lambda$ is the wavelength (in feet).

The initial peak-to-peak spanwise perturbation amplitude $A_O$ is first estimated from the theoretical linear amplification factor $A(x)$, as a function of distance behind the aircraft x, and the distance $x_B$ at which breakup is required. The ratio of the flap vortex and tip vortex perturbations (which are in opposite directions) is roughly equal to the ratio of the tip vortex and flap vortex strengths. The initial amplitude is chosen such that the perturbed vortices on the right and left hand sides touch on the centerline at $x = x_B$. The estimates given by the linear theory are then refined using nonlinear calculations, including when necessary the merger of vortices and/or ground-based experiments.

Each control surface requires a different excitation function to describe the variation of the control-surface position over the oscillation period. The excitation functions are determined by wind-tunnel experiment. The flap and tip vortex positions are measured by a wake survey with different deflections of the control surfaces. The ailerons are deflected out of phase with the flaperon (or spoiler) in order to keep the total lift constant. The vortex positions are determined for different deflection angles, up to the maximum peak-to-peak amplitude required. This information is used to determine the control surface inputs required to achieve the desired vortex perturbation.

Still referring to FIG. 7, at step 108 a numerical (or experimental) simulation of vortex evolution is conducted using the initial conditions to determine whether breakup is achieved at query 110. If breakup does not occur, the amplification mechanisms and control surface movements are adjusted until breakup does occur or until a sufficient level of performance improvement is reached.

The desired initial vortex perturbations are then transformed into control parameters at step 112 for use by the active control surfaces on the airplane. This requires a secondary input of vortex positions (at step 114) as a function of control surface deflections, as determined from wind-tunnel experiments or computations. Finally, the frequencies and deflection angles for the control surfaces are output for use in the active-control system at step 116. As stated above, the output is preferably in the form of a digitally formatted computer table.

Figures 8A, 8B, 8C:
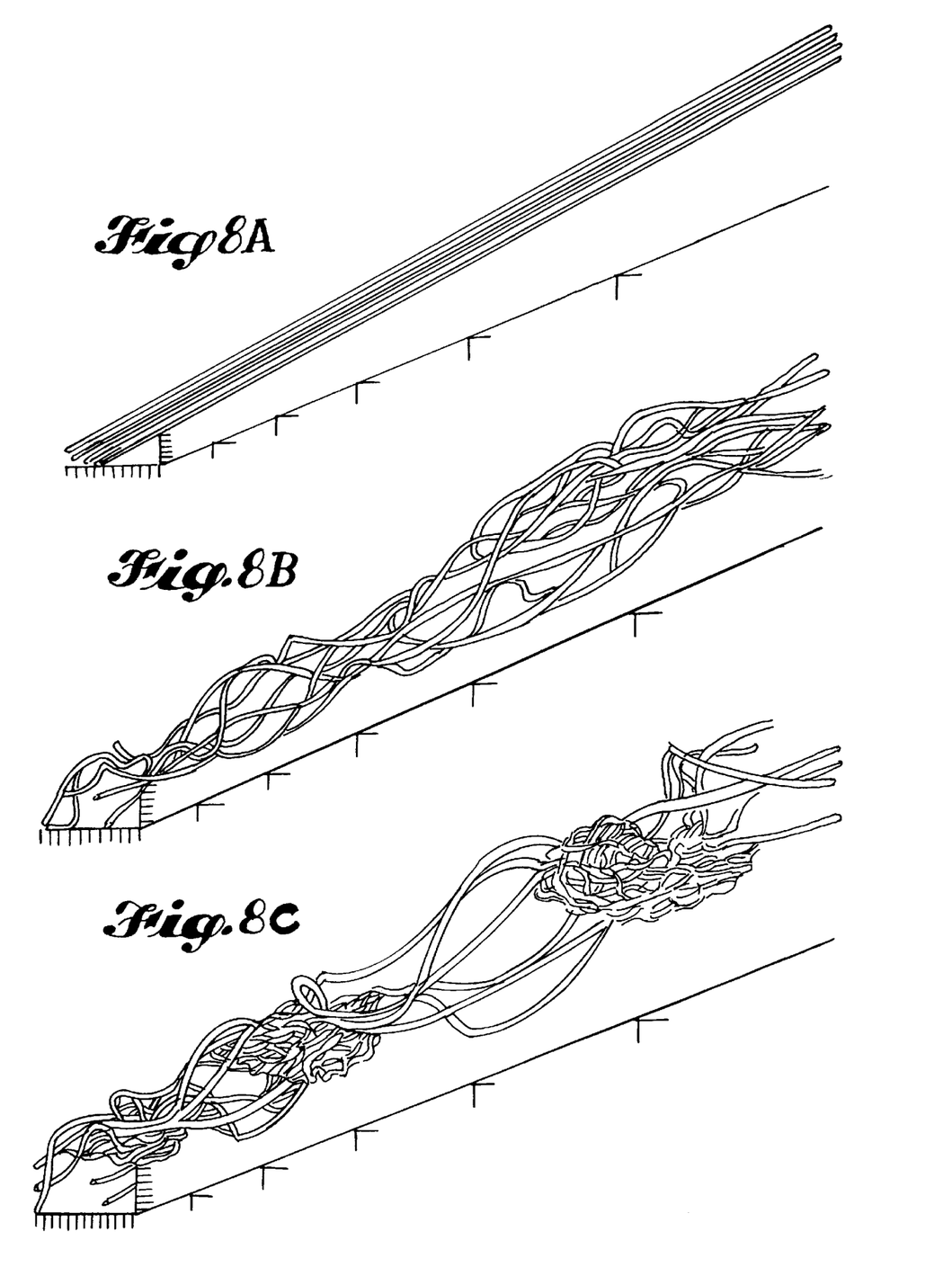
FIGS. 8A–8C are perspective views of the intermediate field effects of using an active control system formed according to the present invention.

FIGS. 8A–8C show the early evolution of an imposed perturbation on wing tip, flap edge, and horizontal tail vortex pairs similar to those of a Boeing 747-400. This result was obtained by direct numerical solution of the Navier-Stokes equations, which govern the dynamics of the vortices. The vortices are shown as viewed from the ground looking up at the vortex wake. Both the Transient Growth Mechanism and Crow Instabilities were selected for amplification. FIG. 8A shows the vortices with the initial perturbation (i.e. as observed directly behind the aircraft). The initial perturbation is almost indistinguishable. Note that the form of the initial perturbation does not directly excite the Crow Instability (i.e., the vortex centroids are unperturbed.) FIG. 8B shows how the perturbations rapidly grow on the vortices due to the Transient Growth Mechanism. FIG. 8C shows the vortices beginning to merge at a distance equivalent to twenty spans behind the aircraft. During the initial amplification, the vorticity centroids become significantly perturbed resulting in a large residual perturbation in the vortices formed after merger. This residual perturbation continues to grow due to the Crow Instability leading to a breakup of the vortices at a distance equivalent to sixty-two spans behind the aircraft (approximately 2.2 nautical miles.) The initial perturbation required a shift of only 2% of the total airplane lift.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of encouraging the early destruction of trailing vortices formed by a lifting body with left and right lifting surfaces which produce at least two trailing vortex pairs, the lifting body having at least two sets of control surfaces, the method comprising:

actuating the control surfaces in a manner leading to the direct excitation of at least one of the Transient Growth Mechanism, the Short Wavelength Instability, and the Long Wavelength Instability to result in the accelerated breakup of the trailing vortices in a prescribed distance; without imposing movement to the centroids of vorticity on the left and right lifting surfaces to achieve breakup in the prescribed distance occurring from direct excitation of Crow Instability.

2. The method according to claim 1, wherein the actuating is accomplished by a controller in electronic communication with the at least two sets of control surfaces.

3. The method according to claim 2, wherein the controller includes a memory and wherein actuating the control surfaces includes determining the appropriate control surface movements by accessing a table stored in the controller memory.

4. The method according to claim 1, wherein the left and right lifting surfaces are left and right aircraft wings and the control surfaces are an aileron and a spoiler located on each wing, and wherein the actuating includes moving the ailerons and moving the spoilers.

5. The method according to claim 1, wherein the left and right lifting surfaces are left and right aircraft wings and the control surfaces are an aileron and a flaperon located on each wing, and wherein the actuating includes moving the ailerons and moving the flaperons.

6. The method according to claim 1, wherein actuating the control surfaces includes actuating the control surfaces in a manner leading to the indirect excitation of the Crow Instability.

7. The method according to claim 1, wherein the left and right lifting surfaces are aircraft left and right wings producing at least two vortex pairs from the wings, and the actuating is accomplished during at least one of airport approach and departure.

8. The method according to claim 1, wherein the actuating of the control surfaces does not significantly alter the lifting body total lift or pitching moment.

9. The method according to claim 1, wherein actuating the control surfaces perturbs the at least two trailing vortex pairs to result in excitation of the Short Wavelength Instability.

10. The method according to claim 1, wherein actuating the control surfaces perturbs the at least two trailing vortex pairs to result in excitation of both the Transient Growth Mechanism and Short Wavelength Instability.

11. The method according to claim 1, wherein actuating the control surfaces perturbs the at least two trailing vortex pairs to result in excitation of the Transient Growth Mechanism.

12. The method according to claim 1, wherein actuating the control surfaces perturbs the at least two trailing vortex pairs to result in excitation of both the Transient Growth Mechanism and the Long Wavelength Instability.

* * * * *

UNITED STATES PATENT AND TRADEMARK OFFICE
CERTIFICATE OF CORRECTION

PATENT NO. : 6,082,679
DATED : July 4, 2000
INVENTOR(S) : J.D. Crouch et al.

It is certified that error appears in the above-identified patent and that said Letters Patent is hereby corrected as shown below:

| COLUMN | LINE | ERROR |
|---|---|---|
| [56] Pg. 1, col. 2 | Refs. Cited (Other Publs. Item 4) | delete "Mar.", second instance |
| [56] Pg. 1, col. 2 | Refs. Cited (Other Publs.) | before the final reference, insert --Crouch, J.D., "Stability of Multiple Trailing-Vortex Pairs," AGARD FDP Symposium, Trondheim, Norway, May 20-23 (1996).-- |
| [56] Pg. 1, col. 2 | Refs. Cited (Other Publs. Item 6) | "Paris," should read --Pairs,-- |

Signed and Sealed this

Seventeenth Day of April, 2001

NICHOLAS P. GODICI

Attest:

Attesting Officer        Acting Director of the United States Patent and Trademark Office